Sept. 11, 1956 J. NIELSON 2,762,241
PORTABLE CHAIN SAW FILING AND GAUGING DEVICE
Filed March 25, 1955 2 Sheets-Sheet 1

INVENTOR
Jack Nielson.
BY Clement Roley
ATTORNEY

Sept. 11, 1956  J. NIELSON  2,762,241
PORTABLE CHAIN SAW FILING AND GAUGING DEVICE
Filed March 25, 1955  2 Sheets-Sheet 2
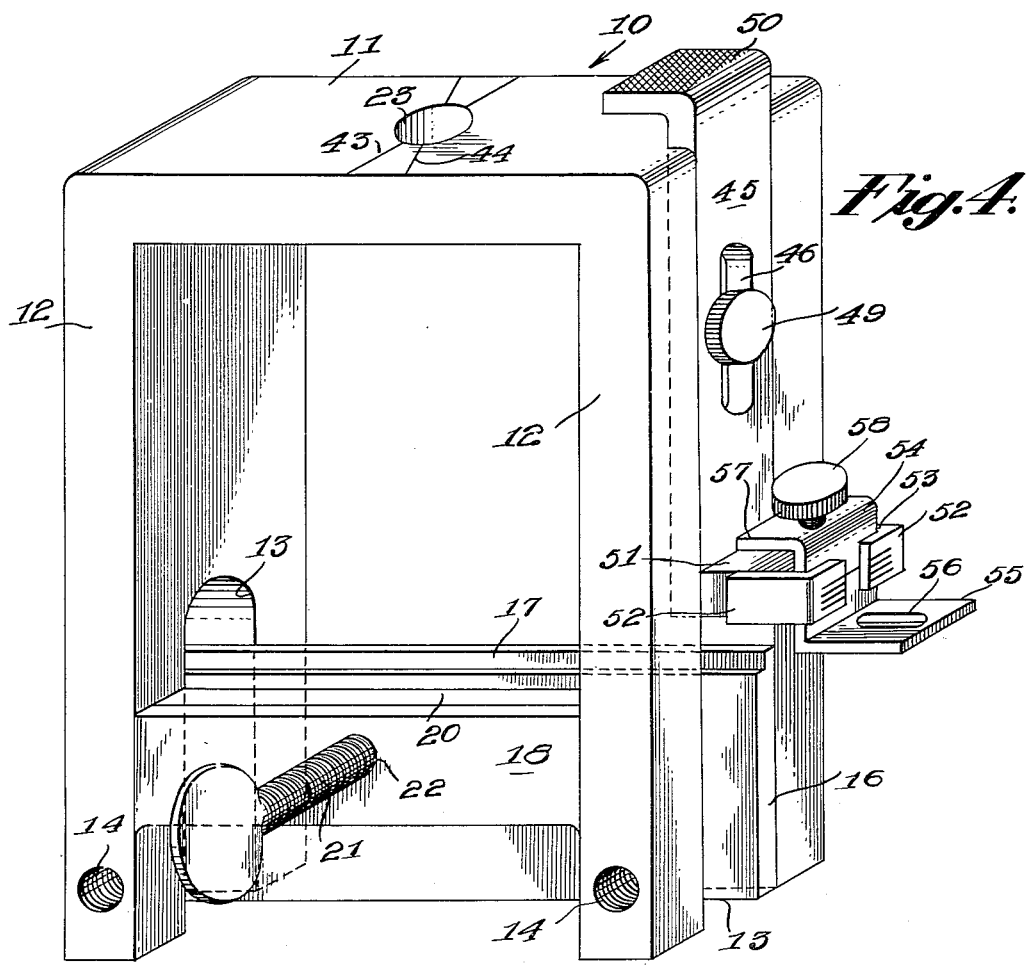
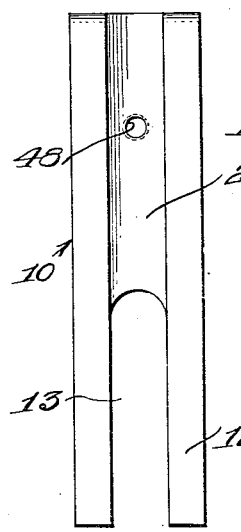
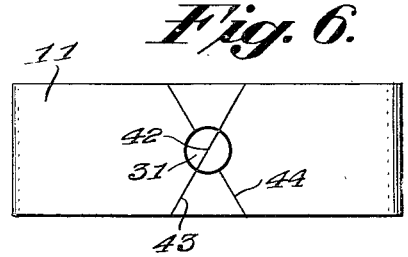
INVENTOR
Jack Nielson,
BY
ATTORNEY United States Patent Office 2,762,241
Patented Sept. 11, 1956

2,762,241

PORTABLE CHAIN SAW FILING AND GAUGING DEVICE

Jack Nielson, Los Angeles, Calif.

Application March 25, 1955, Serial No. 496,831

9 Claims. (Cl. 76—31)

This invention relates to a portable chain saw filing and gauging device.

As is generally known, portable chain saws embody an elongated blade member having a peripheral track groove therein in which ride spaced extensions on the tooth carrying links of the chain. Further the chain embodies two series of teeth, those of one series being cutting teeth and those of the other series, which alternate with those of the first series, being depth gauge teeth.

The cutting teeth are all provided with advance cutting edges disposed at predetermined angles to the longitudinal center line of the chain and alternate cutting teeth have their cutting edges inclined in opposite directions.

For efficient operation of such cutting teeth it is essential that the cutting edges be maintained sharp and that the angle of such cutting edge be maintained constant.

In the operation of such a chain saw the depth gauge teeth ride in the bottom of the kerf immediately in advance of the cutting teeth and function to determine the depth of the bight of the adjacent cutting teeth which is usually variable according to the hardness of material being sawed. It is therefore of primary importance, in any case, that the setting be constant throughout the length of the chain.

Accordingly, it is also necessary under certain conditions to uniformly file down the kerf bottom engaging edges of the depth gauge teeth.

While various forms of chain saw filing and gauging devices have heretofore been proposed the importance of the specific relation between the cutting and depth gauge teeth was given little consideration. It was considered sufficient only if the cutting and depth gauge teeth be filed at different times and in fact without any regard to any specific clamped position of the cutting and depth gauge teeth to assure a uniform bite by the cutting teeth in a sawing operation.

It is accordingly a primary object of this invention to provide a chain saw blade engageable frame having operatively associated therewith means for supporting a file in proper angular position for operation on a cutting tooth and also means for supporting a depth gauge tooth for filing together with gauge means for the depth gauge tooth which is supportable on a cutting tooth, whereby a specific uniform bite for all of the cutting teeth is assured.

A further object of this invention is to provide for the accurate filing of a cutting tooth supported within the frame and immediately thereafter the filing of a depth gauge tooth while the said cutting tooth is supported after which the chain may be moved lengthwise of the blade and within the frame for a like operation including the filing of a succeeding cutting tooth at a different angle and the filing of the depth gauge tooth adjacently associated with the cutting tooth previously filed.

A still further object of the invention is to generally simplify and improve structure and the relationship of parts in a device of this kind to provide greater ease in assembly, adjustment of parts for the subsequent filing operations with a resulting chain saw having maximum cutting efficiency.

Other objects and advantages of the invention will become apparent in the course of the following detailed description, taken in connection with the accompanying drawing wherein:

Fig. 4 is a perspective view of the file supporting frame;

Fig. 5 is a vertical edge elevational view of the frame; and,

Fig. 6 is a top plan view of the frame.

Figure 1:
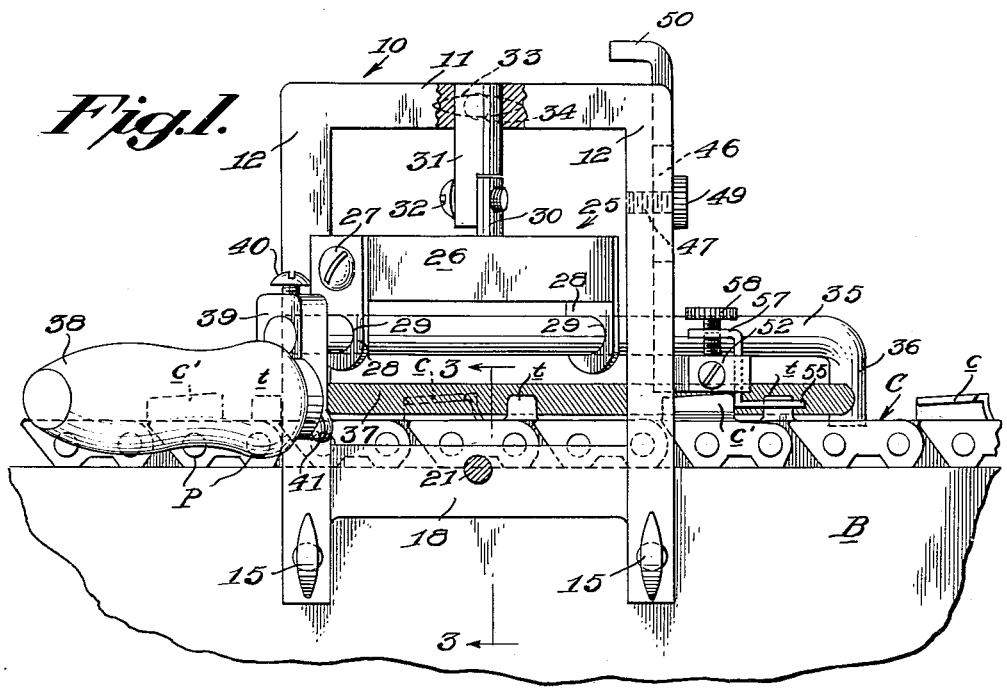
Fig. 1 is a side elevational view of the device in operative association with a chain saw blade which is fragmentally illustrated.
Figure 2:
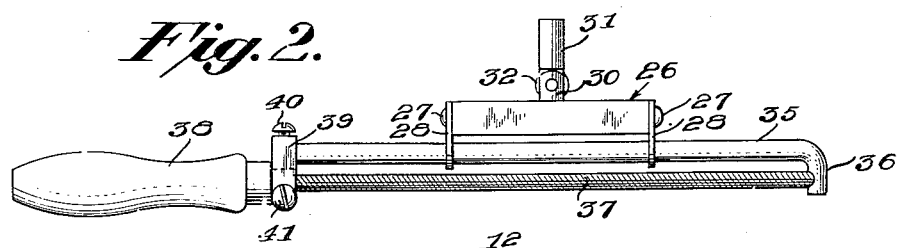
Fig. 2 is a side elevational view of the file structure.

Referring now in detail to the drawing, the improved device in accordance with a preferred structural embodiment thereof comprises a frame 10 which is of generally inverted U-form and which includes an upper horizontal bight portion 11 and opposed depending vertical leg portions 12—12 which are provided with vertical slots 13—13 opening through their lower ends. The vertical slots 13—13 are adapted to receive an edge portion of the blade B of a chain saw, not fully illustrated, as well as portions of the chain saw which are supported by the blade B for movement about the margin thereof during sawing operations. The frame leg portions 12—12 are each provided with a tapped aperture 14 at one side of the slots 13—13. Support thumb screws 15—15 are adjustably positioned in each aperture 14 with the inner ends thereof engaging one side of the saw blade B, as indicated more clearly in Fig. 3.

A plate 16 is disposed within the slots 13—13 with the opposite ends thereof suitably rigidly secured to the legs 12—12. The plate 16 preferably extends the entire width of the frame 10 with the lower edge thereof flush with the lower ends of the legs 12—12.

To effectively clamp the frame 10 to the saw blade B one side of the latter is firmly held in engagement with the plate 16 by means of the thumb screws 15—15.

Figure 3:
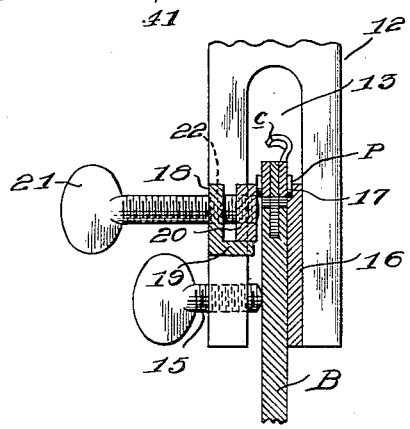
Fig. 3 is a vertical sectional view as observed in the plane of line 3—3 on Fig. 1.

A recessed portion 17 is provided in the upper edge of the plate 16 for the reception of the lower portion of the inner ends of the pivot pins P of the saw chain C, as clearly indicated in Fig. 3.

A second plate 18 is disposed between the legs 12—12 and has the opposite ends thereof suitably rigidly secured to said legs. The plate 18 is provided with a lower horizontal flange 19 on which is slidably supported a clamping bar 20 through which is rotatably supported the free end portion of a set screw 21 the body portion of which is threadedly engaged within a tapped aperture 22 in the plate 18.

Thus upon operation of the thumb screw 21 the bar 20 may be moved into contact with the pivot pins P of the saw chain C, which pivot pins P are also engaged by the plate 16, whereby the saw chain C is held in fixed position on the blade B for filing when the frame 10 is fixed to the blade B by the thumb screws 15.

The upper horizontal bight portion 11 of the frame 10 is provided with a smooth walled vertical aperture 23 which is disposed intermediate the legs 12—12 for the removable and adjustable reception of a cutting tooth filing structure, to be described hereafter. One of the legs 12 of the frame 10 is provided with a vertically disposed channel 24 for the adjustable reception of a filing structure for the depth gauge saw teeth, as will later appear.

The cutting tooth file structure comprises a frame member 25 which includes an elongated bar 26 having rigidly secured thereto at the opposite ends thereof by screws 27, or the like, ears 28—28 having axially aligned apertures 29—29 therethrough. The frame member 26 is further provided with an upward projecting apertured lug 30 which is adjustably secured to the lower end of a cylindrical pin 31 by means of a screw 32, or the like.

The upper end of pin 31 is received within the aperture 23 in the bight portion 11 and is engaged by the inner end of a thumb screw 33 threaded into a tapped aperture 34 whose axis is normal to and bisects the axis of the aperture 23. It should be noted that the frame member 26 is adjustable about the axis of the pin 31 for a purpose later to appear.

Supported within the aligned apertures 29—29 of ears 28—28 for axial reciprocating movement therein is a rod 35 having the advance end 36 thereof downwardly turned. The advance end 36 of the rod 35 is apertured and removably receives the forward end of a file 37. The rear end of the file 37 is secured within a handle 38 and the adjacent rear end of rod 35 is provided with a bracket 39 which is secured thereto by a set screw 40. The bracket 39 is provided with a slotted end which is adapted to releasably engage with the file 37 by means of a set screw 41.

As is generally known, the cutting chain C includes alternating cutting teeth c and c' having the advancing cutting edges thereof disposed in approved angular relation, that is, the cutting edges of teeth c are inclined in one direction relative to the longitudinal axis of the chain C while the teeth c' are inclined in an opposite direction relative to said axis.

While the angles of inclination may vary for different conditions of use it is highly important that the angles be the same for all of the teeth in the chain for any given operation.

For this purpose gauge means are provided which may include a radial line 42 on the upper end of pin 31 for alignment with a line 43 or 44 on the bight portion 11 of the frame 10.

The lines 43 and 44 are positioned in specific angular relation to the longitudinal central vertical plane of the frame 10. It is to be understood that other lines than those illustrated may be provided for other angular dispositions of the file 37 without departing from the novel inventive concept of this invention.

As indicated in Fig. 1 the file 37 is disposed in the plane common to the lines 42 and 43 and is in cooperative relation with the teeth c. Upon loosening thumb screw 33 the pin 31 may be rotated about its axis for disposition of the file 37 in the plane commom to the lines 42, 44 and in cooperative relation with the teeth c' when the chain is moved within the frame. With the file frame 26 in either of the cooperating relative positions, the file 37 is engaged with the cutting edge of a tooth c or c' and reciprocated on its axis through the handle 38.

As is generally known the saw chain C further includes depth gauge teeth t, one in advance of each cutting tooth c, c' to provide a predetermined cut by the cutting teeth dependent upon the amount of extension of the cutting teeth outwardly of the depth gauge teeth.

The depth gauge teeth t also require filing in order to provide a predetermined cut by the cutting teeth and the present invention includes a structure for this purpose.

A flat bar 45 is slidably disposed within the channel 24 of the one leg 12. The bar 45 is provided with a vertically elongated slot 46 through which extends the shank of a set screw 47 which is threaded into a tapped aperture 48 in the bottom of the channel 24. The set screw 47 is provided with a head 49 which bears on the outer wall of the bar 45 for holding same in elevated position within the channel 24 for a purpose to be later described.

The upper end of the bar 45 is provided with a thumb engageable horizontal knurled portion 50 and the lower opposite end of the bar 45 is provided with an outwardly projecting flange 51.

Opposed angle support members 52—52 are secured to the flange 51 and cooperate therewith to provide a vertical slot 53 for receiving the intermediate vertical flange portion 54 of a gauge member. It should be noted that the gauge member additionally includes a forwardly horizontally projecting flange portion 55 provided with a depth gauge tooth receiving slot 56 and an oppositely horizontally projecting flange portion 57 through which extends an adjusting screw 58 adapted to move the flange portion 55 upwardly and downwardly. Gauge lines may be provided on the support members 52 and flange portion 54 for facilitating the setting of the flange portion 55 which is preferably of hard steel in order to withstand the action of a flat file not shown.

In the operation of the device, the frame 10, with the file 37 and depth gauge structure supported thereby, is positioned on the saw blade B, as indicated in Fig. 1, with, the upper edge of the blade and a length of the saw chain disposed within the slots 13.

The frame 10 is so disposed that the lower edges of the projecting pivot pins P, at the inner side of the chain, rest in the recess portion 17 of the plate 16 whereupon the thumb screws 15 are turned into engagement with the blade B to firmly and accurately support the frame on the blade.

The chain which at this time is free on the blade, is moved to a position wherein one of the depth gauge teeth t is disposed beneath the slot 56 in the gauge flange portions 55, at which time the gauge supporting bar 45 is elevated and held in such position by the set screw 49. The thumb screw 21 is now tightened whereby the bar 20 engages the outer ends of the pivot pins P with a resulting clamping of the chain within the frame 10.

The gauge is then lowered until the flange 51 rests on top of the adjacent cutting tooth c' and with the depth gauge tooth t projecting through the slot 56 as indicated in Fig. 1. In this filing position a cutting tooth c will be disposed intermediate to legs 12—12 of the frame 10 with its advance cutting edge substantially in the axis of the pin 31. The pin 31 will then be rotated to the desired angular position of gauge lines such as 43 with the result that the file 37 will be in proper position for filing the tooth c upon axial reciprocation thereof through the handle 38. Any portion of the depth gauge tooth t projecting above the flange portion 55 is filed with a flat file and may be filed before the filing of cutting tooth c or subsequent thereto whereby two operations are performed with a single setting of the chain.

Thereafter the bar 45 is elevated and temporarily held by the screw 49, the clamp bar 20 is released and the chain advanced until the succeeding depth gauge tooth t is disposed beneath the gauge slot 56. Thereafter the gauge is lowered with flange 51 resting on the previously filed cutting tooth c and the chain is again clamped by the bar 20 and a succeeding operation is performed.

The screw 58 provides for any desired adjustment of the gauge and the portions of the gauge teeth t projecting above the horizontal gauge flange portion 55 are filed off down to the upper surface of said flange.

At this point it is to be noted that the knurled portion 50 is engaged by an operator's thumb for holding the gauge down in engagement with a cutting tooth during the filing of an adjacent depth gauge tooth.

While I have disclosed my invention in accordance with a single specific structural embodiment thereof, such is to be considered as illustrative only, and not restrictive, the scope of the invention being defined in the subjoined claims.

What I claim and desire to secure by U. S. Letters Patent is:

1. A filing guide for a chain saw having alternating cutting and depth gauge teeth movably supported on the margin of a chain saw blade; said guide comprising an inverted U-frame having slots opening through the ends of the legs thereof, means for removably securing the frame on the saw blade with an edge portion thereof disposed within the slots, a cutting tooth filing guide structure including a pin supported in the bight of said frame, said frame structure being adjustable about the axis of the pin, an elongated file carried by said filing guide structure for filing successive cutting teeth disposed within the frame upon proper angular setting of said pin and gauging means carried by said U-frame, spaced from said filing guide structure, and engageable with a depth gauge tooth to position the filing guide structure relative to a cutting tooth.

2. A filing guide for a chain saw having alternating cutting and depth gauge teeth movably supported on the margin of a chain saw blade; said guide comprising an inverted U-frame including spaced parallel legs and a bight portion, said legs being provided with slots opening through their ends for receiving a marginal portion of said blade, means supported by said legs for removably clamping the frame on the blade, means supported by the frame for clamping the saw chain in position with at least one cutting tooth disposed within the frame, file guiding and supporting means carried by the bight portion of the frame for guiding a file in filing successive cutting teeth and gauging means supported by the frame for gauging the filing of successive depth gauge teeth.

3. The structure according to claim 2, wherein said guiding means is adjustable about a vertical axis, and wherein said gauging means include a depth gauge tooth receiving slot, whereby when a depth gauge tooth is received in said slot a cutting tooth has its cutting edge substantially disposed in said axis.

4. The structure according to claim 2, wherein said guiding means comprises a pin supported in said bight portion for adjustment about a vertical axis through angles corresponding to that of the cutting edges of the cutting teeth, a frame supported by said pin in right angular relation thereto, and an elongated file supported by said frame for axial reciprocation, and said gauging means being supported by one of the legs of said frame and including a depth gauge tooth receiving gauge means.

5. The structure according to claim 2, wherein said saw chain clamping means comprises a plate rigidly secured to the legs of said frame at one side of said slots, and having a longitudinal recess in its upper edge for receiving the heads of pivot pins at one side of the chain for proper positioning of the frame relative to the blade.

6. The structure according to claim 4, wherein said gauging means comprises a bar supported by one of said legs externally thereof, means cooperating with said bar and said one of said legs for retaining the bar in elevated position, and gauge means supported by the lower end of said bar including a plate having a slot therein for receiving the upper end of a depth gauge tooth.

7. The structure according to claim 6, together with means for vertically adjusting said plate relative to said bar.

8. The structure according to claim 6 together with a lateral projecting flange on the lower end of said bar on which said gauge means is supported and the dimension of said device being so correlated that said flange rests on a cutting tooth when another cutting tooth is disposed substantially centrally of said frame for filing operation thereof.

9. A filing device for a chain saw having alternating cutting and depth gauge teeth movably supported on the margin of a blade; said device comprising an inverted U-frame having slots opening through the ends of the legs thereof, means for removably securing the frame on the saw blade with an edge portion thereof disposed within the slots, a tooth gauging and filing structure adjustably mounted on said frame and movable relative thereto and to said blade for guiding a file adjacent a cutting tooth and gauging means outside said U-frame for engaging a depth gauge tooth to position the gauging and filing structure relative to a cutting tooth, and for gauging the filing of a depth gauge tooth.

References Cited in the file of this patent

UNITED STATES PATENTS

| Number | Name | Date |
|---|---|---|
| 27,937 | Tripp | Apr. 17, 1860 |
| 424,724 | Penrose | Apr. 1, 1890 |
| 537,827 | Kaempfer | Apr. 23, 1895 |
| 566,003 | Mitchell | Aug. 18, 1896 |
| 1,165,248 | Hanson | Dec. 21, 1915 |
| 1,223,191 | Merritt | Apr. 17, 1917 |
| 2,427,412 | McCulley | Sept. 16, 1947 |